United States Patent Office 3,165,861
Patented Jan. 19, 1965

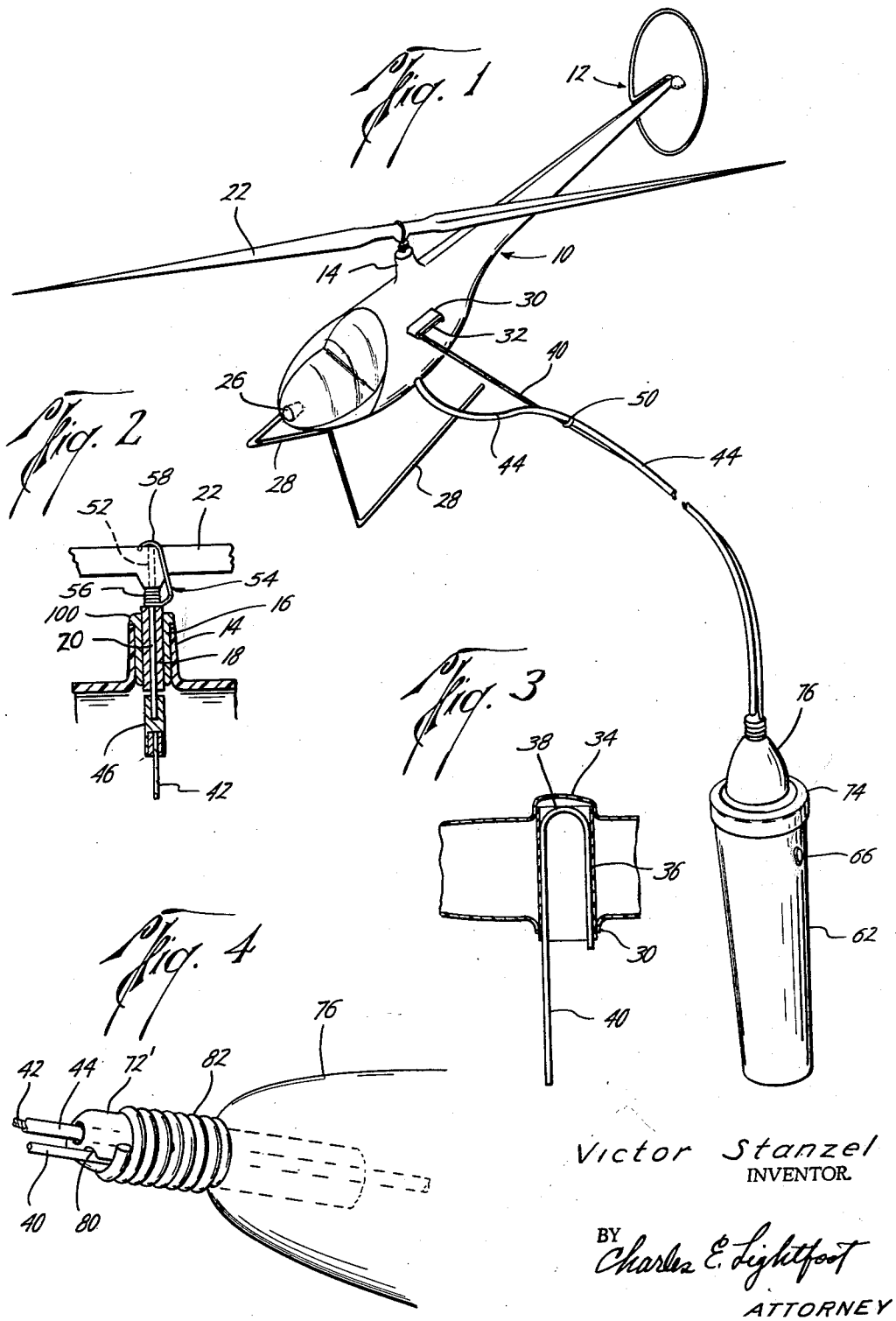

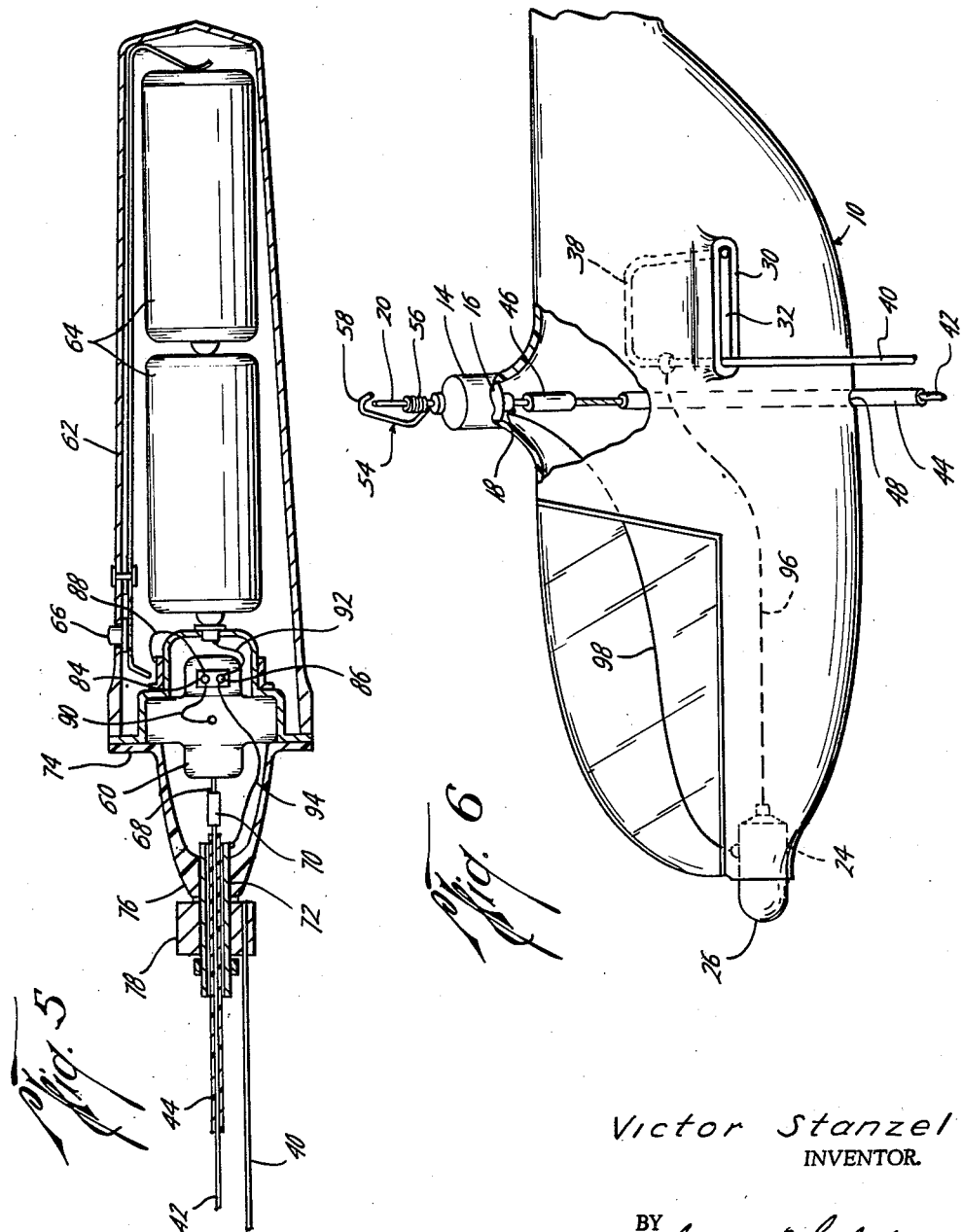

3,165,861
ELECTRICALLY POWERED VERTICAL
AIR-LIFT TOY
Victor Stanzel, P.O. Box 171, Schulenburg, Tex.
Filed June 4, 1962, Ser. No. 199,712
4 Claims. (Cl. 46—228)

This invention relates to toy aircraft and more particularly to toy aircraft of the helicopter type which is operated by an electric motor not located on or carried by the craft.

The invention has for an important object the provision of a vertical air-lift toy, of the helicopter type, which is powered by batteries of the kind commonly used in flashlights and which is capable of taking off and landing vertically and hovering or travelling forward and backward in flight.

Toy aircraft of the helicopter type, having manually operated driving means have been available for some time. It has not been feasible heretofore, however, to make use of electric power for the propulsion of aircraft of this type, because of the construction and weight of the craft, and inherent friction of their driving mechanism and the limited power output available by the use of electric motors operated by flashlight batteries.

In view of the convenience and ready availability of batteries of the flashlight type and the safety and ease of control of this form of electric power, however, it is a further object of this invention to provide a direct drive device powered by batteries of this type for the operation of a horizontal air-lift rotor which is efficient and whose friction is sufficiently low to supply adequate power to the rotor to successfully propel a vertical air-lift toy of the character mentioned.

Another object of the invention is to provide a direct drive device operated by a battery powered electric motor for driving the lifting rotor of a toy aircraft of the helicopter type whereby the power losses resulting from the friction of transmission gears or gear trains is eliminated.

A further object of the invention is to provide a vertical air-lift toy which is of light weight, efficient and easily controlled in operation, and of strong and rugged construction, having long wearing qualities, and capable of withstanding the extreme conditions of hard usage to which devices of this character are customarily subjected.

Another object of the invention is to provide a battery operated vertical air-lift toy of the character referred to which is of simple design and economical construction, and which may be operated for long periods of time at a minimum expenditure of electrical power.

A further object of the invention is the provision in an aircraft toy of the kind mentioned of electrical driving means therefor which is powered from a source remote from the aircraft, and embodying an electric light carried by the craft and which is powered from the same source.

The above and other important objects and advantages of the invention may best be understood from the following detailed description, constituting a specification of the same when considered in conjunction with the annexed drawings, wherein—

FIGURE 1 is a perspective view, on a somewhat reduced scale, of a preferred embodiment of the invention showing the aircraft and its propulsion and control mechanism;

FIGURE 2 is a fragmentary cross-sectional view, of a portion of the propeller or lift rotor driving means of the invention and the means by which the rotor is connected thereto;

FIGURE 3 is a fragmentary cross-sectional view, of a portion of the fuselage of the aircraft of the invention, showing the manner in which the flight controlling mechanism is connected thereto;

FIGURE 4 is a fragmentary perspective view of a portion of a preferred form of the rotor operating and flight controlling mechanism, showing the manner in which the same are connected to the driving means therefor;

FIGURE 5 is a longitudinal, central, cross-sectional view, of the electrical power source and driving motor arrangement of the invention, including a somewhat modified form of the flight control mechanism of the same; and FIGURE 6 is a side elevational view, partly broken away and partly in cross-section, of the fuselage of the aircraft of the invention, showing structural details of the parts and arrangement of the control and propulsion mechanism of the same and portions of the electric lighting arrangement.

Referring now to the drawings in greater detail the toy aircraft of the invention has a hollow, thin walled body or fuselage, generally designated 10, preferably formed of molded plastic by which the fuselage is given a light and strong construction, the fuselage being preferably shaped in the same manner as a helicopter of conventional design. The body is formed with the usual tail assembly generally designated 12, and has an upwardly extending hollow projection or socket 14, located substantially in vertical alignment with the center of gravity of the craft, within which a vertically disposed bearing plug 16, which carries a metal bearing sleeve 18, through which a rotor driving shaft 20 extends upwardly for connection at its upper end to a lifting rotor or propellor 22, of usual design, by which the aircraft is propelled.

At its forward end the fuselage is provided with a socket portion 24 for the reception of an electrically lighted bulb 26. The fuselage is also provided with the usual landing skids 28.

At one side of the fuselage the same is provided with an external, laterally extending, longitudinally elongated projection 30, which is shaped to provide a longitudinally extending slot 32, and laterally opposite this projection there is a similar external projection 34, best seen in FIGURE 3, which is closed. A flattened tubular sleeve 36 may be extended through the slot 32 of the projection 30, whose inner end extends into a similar slot in the projection 34, this sleeve extending laterally across the interior of the fuselage to reinforce the same and within this sleeve the U-shaped outer end portion 38 of an elongated, flexible, guiding and supporting element 40 is extended, which guiding and supporting element extends to a location remote from the fuselage. The guiding and supporting element 40 may take the form of a metallic wire, formed of steel, such as piano wire or other similar material, which may serve as an electrical conductor.

The shaft 20 of the rotor or helicopter screw is rotated by means of a flexible cable 42, which is rotatably extended through a flexible tube 44, preferably formed of plastic, and which extends to a location remote from the aircraft, the outer end of the cable 42 being suitably connected to the outer end of the shaft 20 as by means of a coupling element 46, and the flexible tube 44 extended at its outer end through a suitably located bottom opening 48 in the fuselage. The flexible tube 44 may be suitably attached to the guide wire 40 at longitudinally spaced intervals thereon, as indicated at 50, so that the flexible cable and guide wire extend in the same direction generally away from the fuselage. The rotor 22 has a central opening 52, through which the outer end of the shaft 20 is extended, and is secured to the shaft by means of a releasable connector 54, having a coil 56 which is tightened about the shaft, and a hook portion 58, which may be extended over the rotor, outwardly beyond the outer end of the shaft 20, to releasably hold the rotor on the shaft for rotation therewith.

The aircraft is powered from an electric motor 60, which is housed in a casing 62, such as a flashlight case, within which batteries 64 are located in the usual manner, and which is provided with a switch 66 by which an electric circuit, including the batteries and motor 60, may be opened and closed to control the operation of the motor. The motor 60 has a shaft 68, which is connected, as by means of a connector element 70 to the adjacent end of the cable 42, which extends through a tubular member 72, attached to a cap 74 carried on one end of the case 62, and which is formed with an external conical portion or nose 76. The flexible tube 44 extends through the tubular member 72 and is attached thereto in surrounding relation to the cable 42.

A tubular knob or ring 78, rotatably positioned on the member 72 for rotation thereon externally of the nose 76 and the guide wire or flexible guiding element 40 is attached to this ring, in radially outwardly spaced relationship to the member, whereby the guide wire may be rotated by rotation of the ring independently of the cable 42, to turn the fuselage upwardly or downwardly in flight about the guide wire as an axis.

The guide wire 40 may be of relatively smaller diameter, so that it does not interfere substantially with the vertical movements of the aircraft in flight, and in operating the aircraft, constructed and arranged as described above, the operator may hold the flashlight case 62 in his hand, so that upon closing of the switch 66 the motor 60 will be operated to drive the cable 42, whereby the motor 22 will be rotated to lift the aircraft. With the aircraft thus in flight the ring 78 may be rotated about the member 72, to rotate the guide wire 40, to apply a rotative force to the aircraft, to tilt the aircraft upwardly or downwardly about its lateral axis, whereby the direction of flight of the aircraft may be controlled.

A somewhat modified form of the control mechanism of the invention is illustrated in FIGURE 4, wherein the nose 76 is provided with a tubular member 72', which is nonrotatively attached thereto, and through which the flexible tube 44 is extended, and through which the cable 42 is also extended for connection to the shaft 76 of the motor 60. In this form of the control mechanism the guide wire 40 is extended through an external longitudinal groove 80 in the member 72', and is then wound about the exterior of the member about the portion of the wire which extends into the groove 80, as shown at 82, to nonrotatively connect the wire to the member. In making use of this form of the control mechanism the motor 60 is operated in substantially the same manner to drive the cable 42, and the direction of the craft in flight is controlled by turning the case 62 bodily about its longitudinal axis, to rotate the guide wire 40 in the desired direction.

Both the guide wire 40 and the cable 42 are preferably formed of metal to act as electrical conductors whereby current from the batteries 64 is conducted to the light bulb 26 on the aircraft. For this purpose the brushes of the motor 60 are provided with contacts 84 and 86, the contact 84 being connected by a conductor 88 to one contact of the switch 66, and being also grounded by conductor 90 to the motor casing, whereby current from the batteries is conducted through the motor shaft 68 and coupling 70 to the cable 42. The contact 86 is connected by a conductor 92 to the batteries 64, and by a conductor 94 to the member 72, which is formed of metal, so that current may flow through the guide wire 40 and ring 78, which is also formed of metal, back through the member 72 and conductors 94 and 92, to complete the light circuit.

The light 26 is inserted in an electric socket carried in the socket 24 at the forward end of the fuselage, which socket is connected by a conductor 96 to the guide wire 40 and also by another conductor 98 to the bearing 18, through which the shaft 20 is supportably extended. The connector 46, the bearing 18, and the shaft 20 are, of course, formed of conducting material, whereby the circuit is established through the conductors 96 and 98 to light the light 26, when the switch 66 is closed.

By forming the plug 16 of suitable material, such as plastic, with an external annular shoulder 100 thereon, the plug may be inserted in the tubular projection 14 of the fuselage, during the assembling of the fuselage, as shown in FIGURE 2, and cemented thereto to provide a structure which is of economical manufacture.

Similarly, the parts of the flashlight case 62 and the cap 74 may be formed of plastic, to provide insulation for the electrical elements of the driving and lighting mechanism of the craft.

It will be apparent that by attaching the flexible plastic tube 44 to the guide wire 40, the guide wire forms a support for the same, and that the flexible tube does not interfere in any way with the control of the flight of the craft by the rotation of the guide wire, either independently of the case 62 or by bodily rotation of the case and the guide wire therewith.

It will thus be seen that the invention, constructed as described above, provides a toy aircraft of the vertical lift type which is propelled from a power source located remotely from the craft, and by which the flight of the craft may be easily and accurately controlled.

The invention is disclosed herein in connection with a certain specific embodiment of the same, which it will be understood is intended by way of example only, the invention being capable of various modifications within the scope of the appended claims.

Having thus clearly shown and described the invention, what is claimed as new and desired to secure by Letters Patent is:

1. In a model aircraft of the helicopter type having a hollow fuselage and a rotatable propeller arranged above the fuselage in position to exert a lifting force on the fuselage upon rotation of the propeller, an elongated flexible, power transmitting element connected to the propeller to rotate the propeller and extending to a location remote from the aircraft, power means under the control of an operator at said location for rotating the element, said fuselage having laterally aligned, longitudinally extending slots in its opposite sides, a flattened tubular member extending laterally across the interior of said fuselage and open at one end to the exterior through one of said slots, an elongated, flexible shaft having a longitudinal axis distinct from that of said element and extending at one end into the open end of said member and having a U-shaped end portion in the member positioned for coaction with the member to tilt the fuselage vertically upon axial rotation of the shaft and extending to said location, and means forming a connection between said shaft and a fixed element of said power means to cause the shaft to rotate axially upon rotation of said fixed element.

2. In a model aircraft of the helicopter type having a hollow fuselage and a rotatable propeller arranged above the fuselage in position to exert a lifting force on the fuselage upon rotation of the propeller, an elongated flexible, power transmitting element connected to the propeller to rotate the propeller and extending to a location remote from the aircraft, power means under the control of an operator at said location for rotating the element, a flattened tubular member extending laterally across the interior of said fuselage and open at one end to the exterior, an elongated, flexible shaft having a longitudinal axis distinct from that of said element and extending at one end into the open end of said member and having a U-shaped end portion in the member positioned for coaction with the member to tilt the fuselage vertically upon axial rotation of the shaft and extending to said location, and means forming a rotatable connection between said shaft and said power means to allow said shaft to rotate axially independently of said element.

3. In a model aircraft of the helicopter type having a fuselage and a rotatable propeller arranged above the fuselage in position to exert a lifting force on the fuselage upon rotation of the propeller, an elongated, flexible power transmitting element formed of electrically conductive material connected to the propeller to rotate the propeller and extending to a location remote from the aircraft, electrically operable means under the control of an operator at said location for rotating said element and including a source of electrical current, electrical insulating means surrounding said element and within which the element is rotatable, a rotatable, flexible shaft formed of electrically conductive material fixedly connected at one end to the fuselage at a position to cause the fuselage to tilt vertically upon axial rotation of the shaft and extending to said location, means for rotating said shaft independently of said element, electric light means mounted on said fuselage and conductor means forming an electrical circuit between said light means and said source through said shaft and element to supply electric current to said light means.

4. In a model aircraft of the helicopter type having a hollow fuselage and a rotatable propeller arranged above the fuselage in position to exert a lifting force on the fuselage upon rotation of the propeller, an elongated, flexible, tubular member formed of electrically insulating material extending at one end into the fuselage and whose other end extends to a location remote from the aircraft, an elongated, flexible, power transmitting element formed of electrically conductive material extending through said member and connected to the propeller to rotate the propeller, power means under the control of an operator at said location and including an electric motor and a source of electrical current for rotating said element, a rotatable, flexible shaft formed of electrically conductive material connected at one end to the fuselage to cause the fuselage to tilt vertically upon axial rotation of the shaft and whose other end is fixedly connected to a fixed element of said power means to rotate said shaft upon rotation of said fixed element, electric light means mounted on the fuselage, and conductor means forming an electrical circuit between said light means and said source through said shaft and element.

References Cited by the Examiner
UNITED STATES PATENTS

| | | | |
|---|---|---|---|
| 2,779,595 | 1/57 | Ensley | 272—31 |
| 2,885,206 | 5/59 | Ensley | 46—75 |
| 2,968,119 | 1/61 | Glass et al. | 46—243 X |
| 3,018,585 | 1/62 | Stanzel | 46—243 |

DELBERT B. LOWE, *Primary Examiner.*

RICHARD C. PINKHAM, *Examiner.*